US012639058B2

(12) United States Patent　　　(10) Patent No.:　US 12,639,058 B2

Kazatsker et al.　　　(45) Date of Patent:　　May 26, 2026

(54) SOFTWARE UPDATES IN A NETWORK INTERFACE DEVICE

(71) Applicant: Intel Corporation, Santa Clara, CA (US)

(72) Inventors: Kirill Kazatsker, Ramat Gan (IL); Keren Guy, Sunnyvale, CA (US); Anjali Singhai Jain, Portland, OR (US); Matthew Vick, Hillsboro, OR (US); Jayaprakash Shanmugam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/135,566

(22) Filed: Apr. 17, 2023

(65) Prior Publication Data

US 2023/0259352 A1　　Aug. 17, 2023

Related U.S. Application Data

(63) Continuation-in-part of application No. 17/747,955, filed on May 18, 2022, which is a continuation-in-part of application No. 17/670,355, filed on Feb. 11, 2022.

(51) Int. Cl.
　　　*G06F 8/65*　　　　(2018.01)
　　　*G06F 3/06*　　　　(2006.01)
　　　　　　(Continued)

(52) U.S. Cl.
　　　CPC .............. *G06F 8/65* (2013.01); *G06F 3/0604* (2013.01); *G06F 3/0607* (2013.01);
　　　　　　(Continued)

(58) Field of Classification Search
　　　CPC ...... G06F 8/60–66; G06F 21/51; G06F 21/57; H04L 67/34
　　　　　　(Continued)

(56) References Cited

U.S. PATENT DOCUMENTS

| | | | |
|---|---|---|---|
| 8,849,949 B1 * | 9/2014 | Pani | H04L 49/65 |
| | | | 709/204 |
| 10,164,829 B1 | 12/2018 | Watson et al. | |

(Continued)

FOREIGN PATENT DOCUMENTS

| | | | | |
|---|---|---|---|---|
| WO | WO-2007138488 A2 * | 12/2007 | | G06F 8/65 |
| WO | WO-2013147731 A1 * | 10/2013 | | H04L 45/74 |
| WO | WO-2014023150 A1 * | 2/2014 | | G06F 8/656 |

OTHER PUBLICATIONS

Burres, Brad et al., "Intel's Hyperscale-Ready Infrastructure Processing Unit (IPU)", Hot Chips, Aug. 2021, 16 pages.

(Continued)

*Primary Examiner* — Geoffrey R St Leger

(74) *Attorney, Agent, or Firm* — Compass IP Law PC

(57) ABSTRACT

Examples described herein relate to a network interface device. In some examples, the network interface device includes a network interface device that includes a network interface, a host interface, and multiple processors. In some examples, a first processor of the multiple processors is to execute a first control plane process and an embedded software update is to occur by: installation and execution of a second control plane process on the first processor and a third control plane process is to cause utilization of the second control plane process.

17 Claims, 8 Drawing Sheets

(51) Int. Cl.

| | |
|---|---|
| *G06F 21/51* | (2013.01) |
| *G06F 21/57* | (2013.01) |
| *H04L 41/0806* | (2022.01) |
| *H04L 41/0816* | (2022.01) |
| *H04L 41/0895* | (2022.01) |
| *H04L 67/00* | (2022.01) |
| *H04L 41/046* | (2022.01) |
| *H04L 41/082* | (2022.01) |
| *H04L 41/14* | (2022.01) |
| *H04L 41/16* | (2022.01) |

(52) U.S. Cl.
CPC .......... *G06F 3/0632* (2013.01); *G06F 3/0679* (2013.01); *G06F 21/51* (2013.01); *G06F 21/57* (2013.01); *H04L 41/0806* (2013.01); *H04L 41/0816* (2013.01); *H04L 41/0895* (2022.05); *H04L 67/34* (2013.01); *H04L 41/046* (2013.01); *H04L 41/082* (2013.01); *H04L 41/145* (2013.01); *H04L 41/16* (2013.01)

(58) Field of Classification Search
USPC .................................................. 717/168–178
See application file for complete search history.

(56) References Cited

U.S. PATENT DOCUMENTS

| | | | | |
|---|---|---|---|---|
| 10,642,702 | B1 | 5/2020 | Khan et al. | |
| 11,271,895 | B1* | 3/2022 | Vallala ................ | H04L 41/0803 |
| 2010/0169709 | A1* | 7/2010 | Chiu ................... | G06F 11/1004 |
| | | | | 711/E12.008 |
| 2013/0219030 | A1* | 8/2013 | Szabo ..................... | H04L 49/70 |
| | | | | 709/221 |
| 2014/0105068 | A1* | 4/2014 | Xu .......................... | H04L 67/34 |
| | | | | 370/255 |
| 2016/0013971 | A1 | 1/2016 | Caviglia et al. | |
| 2017/0168803 | A1* | 6/2017 | Katiyar ..................... | G06F 8/65 |
| 2018/0123961 | A1 | 5/2018 | Farmanbar et al. | |
| 2019/0042741 | A1 | 2/2019 | Abodunrin et al. | |
| 2019/0121960 | A1* | 4/2019 | Brown .................... | G06F 21/74 |
| 2019/0303129 | A1* | 10/2019 | Nidumolu ............. | H04L 45/563 |
| 2020/0275306 | A1 | 8/2020 | Shah et al. | |
| 2021/0034376 | A1* | 2/2021 | Kalla ................... | G06F 9/4416 |
| 2021/0385161 | A1* | 12/2021 | Ghosh .................... | H04L 45/64 |
| 2022/0091872 | A1 | 3/2022 | Huilgol et al. | |
| 2022/0407775 | A1 | 12/2022 | Khan et al. | |
| 2023/0074222 | A1 | 3/2023 | Kumar et al. | |
| 2023/0229779 | A1* | 7/2023 | Terpstra ................... | G06F 8/63 |
| | | | | 713/2 |
| 2024/0028322 | A1* | 1/2024 | Wu ..................... | G06F 9/45558 |
| 2024/0048398 | A1 | 2/2024 | He et al. | |

OTHER PUBLICATIONS

Krazit, Tom, "Intel's new companion chip for cloud providers has arm inside", https://www.protocol.com/enterprise/intel-mount-evans-arm, Aug. 19, 2021, 4 pages.

Linux manual page, "devlink-dev devlink device configuration", https://man7.org/linux/man-pages/man8/devlink-dev.8.html, Devlink-Dev(8), Mar. 14, 2016, 6 pages.

First Office Action for U.S. Appl. No. 17/747,955, Mailed Jun. 11, 2025, 10 pages.

First Office Action for U.S. Appl. No. 17/670,355, Mailed Jul. 21, 2025, 18 pages.

First Office Action for U.S. Appl. No. 17/882,317, Mailed Sep. 18, 2025, 28 pages.

Final Office Action for U.S. Appl. No. 17/747,955, Mailed Dec. 29, 2025, 9 pages.

* cited by examiner

PERFORM FIRST PROCESS ON FIRST PLATFORM
402

PERFORM SECOND PROCESS ON SECOND PLATFORM
404

PERFORM THIRD AND FOURTH PROCESSES ON FIRST AND SECOND PLATFORMS
406

DISABLE EXECUTION OF FIRST AND SECOND PROCESSES
408

600

SOFTWARE UPDATES IN A NETWORK INTERFACE DEVICE

RELATED APPLICATIONS

The present application is a continuation-in-part of U.S. patent application Ser. No. 17/670,355, filed Feb. 11, 2022 and a continuation-in-part of U.S. patent application Ser. No. 17/747,955, filed May 18, 2022. The contents of those applications are incorporated herein in their entirety.

BACKGROUND

In a datacenter, some network interface devices include programmable data planes that are configurable by a control plane. The control plane can configure the programmable data planes with certain rules of operation so that the network interface device can independently perform packet processing operations.

DETAILED DESCRIPTION

Various examples provide for updating embedded software (e.g., firmware) of a network interface device by a first process, executing in a first processor, changing an active control plane process from a first control plane process, executed in a second processor, to a second control plane process executed in the second processor. For example, a first process can execute in a first virtual execution environment on a first processor and can access a second process that can execute in a second virtual execution environment on a second processor. For example, the first process can access the second process to collectively perform control plane and/or data plane processes such as firmware. To update embedded software, a third virtual execution environment can be deployed, a third process can execute in the third virtual execution environment in the first processor, and a fourth process can execute in the third virtual execution environment or a fourth virtual execution environment in the second processor, and the third process can switch to use of the fourth process.

Figure 1A:
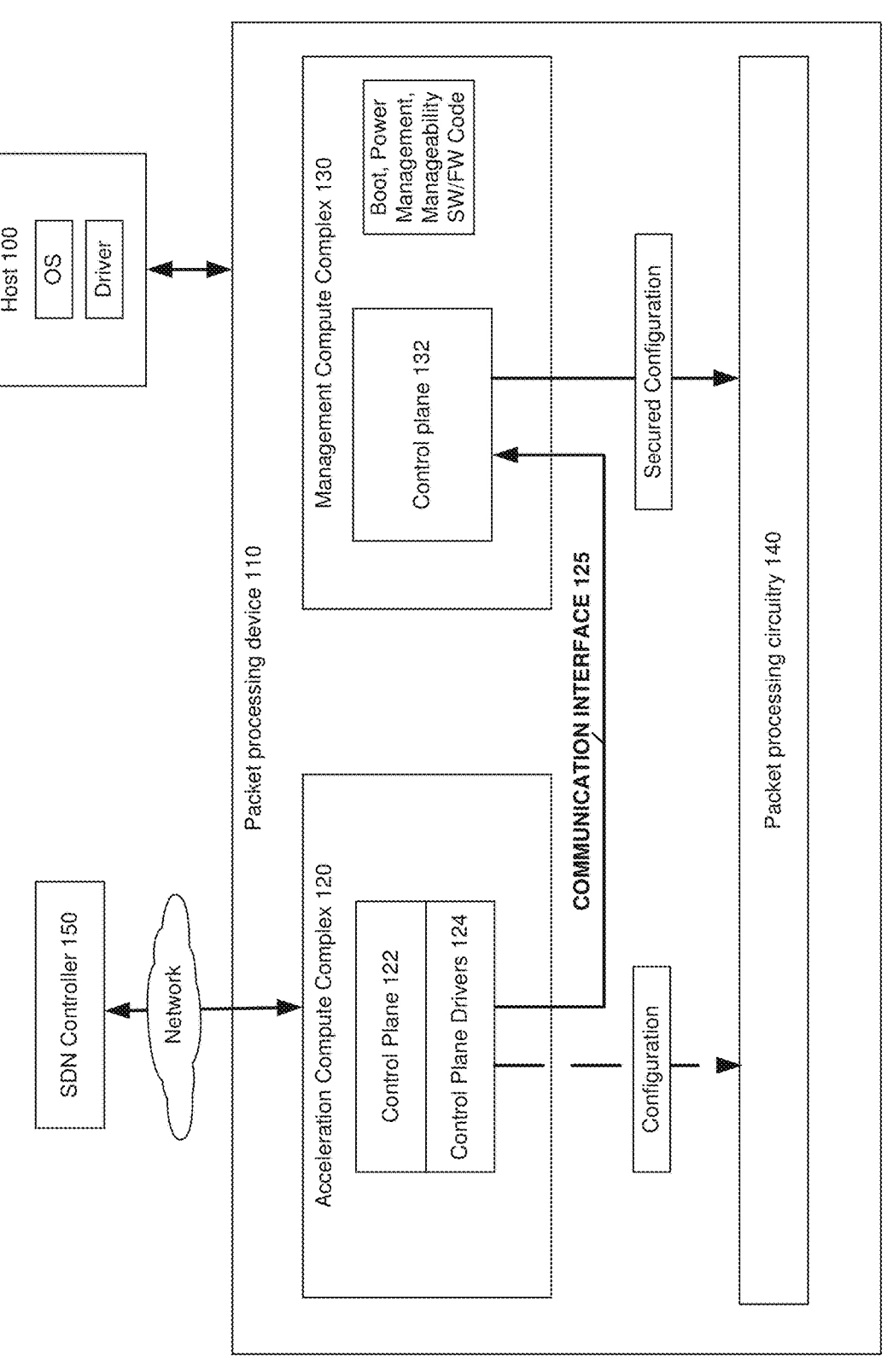
FIGS. 1A and 1B depict example systems.

FIG. 1A depicts an example system. Host 100 can include processors, memory devices, device interfaces, as well as other circuitry such as described with respect to FIGS. 5-7. Processors of host 100 can execute software such as applications (e.g., microservices, virtual machine (VMs), microVMs, containers, processes, threads, or other virtualized execution environments), operating system (OS), and device drivers. An OS or device driver can configure packet processing device 110 to utilize one or more control planes to communicate with software defined networking (SDN) controller 150 via a network to configure operation of the one or more control planes.

Packet processing device or data plane circuitry 110 can include multiple compute complexes, such as an Acceleration Compute Complex (ACC) 122 and Management Compute Complex (MCC) 130, as well as packet processing circuitry 140 and network interface technologies for communication with other devices via a network. ACC 120 can be implemented as one or more of: a microprocessor, processor, accelerator, field programmable gate array (FPGA), application specific integrated circuit (ASIC) or circuitry described at least with respect to FIGS. 5-7. Similarly, MCC 130 can be implemented as one or more of: a microprocessor, processor, accelerator, field programmable gate array (FPGA), application specific integrated circuit (ASIC) or circuitry described at least with respect to FIGS. 5-7. In some examples, ACC 120 and MCC 130 can be implemented as separate cores in a CPU, different cores in different CPUs, different processors in a same integrated circuit, different processors in different integrated circuit.

Figure 5:
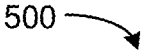
FIG. 5 depicts an example packet processing device.
Figure 5:
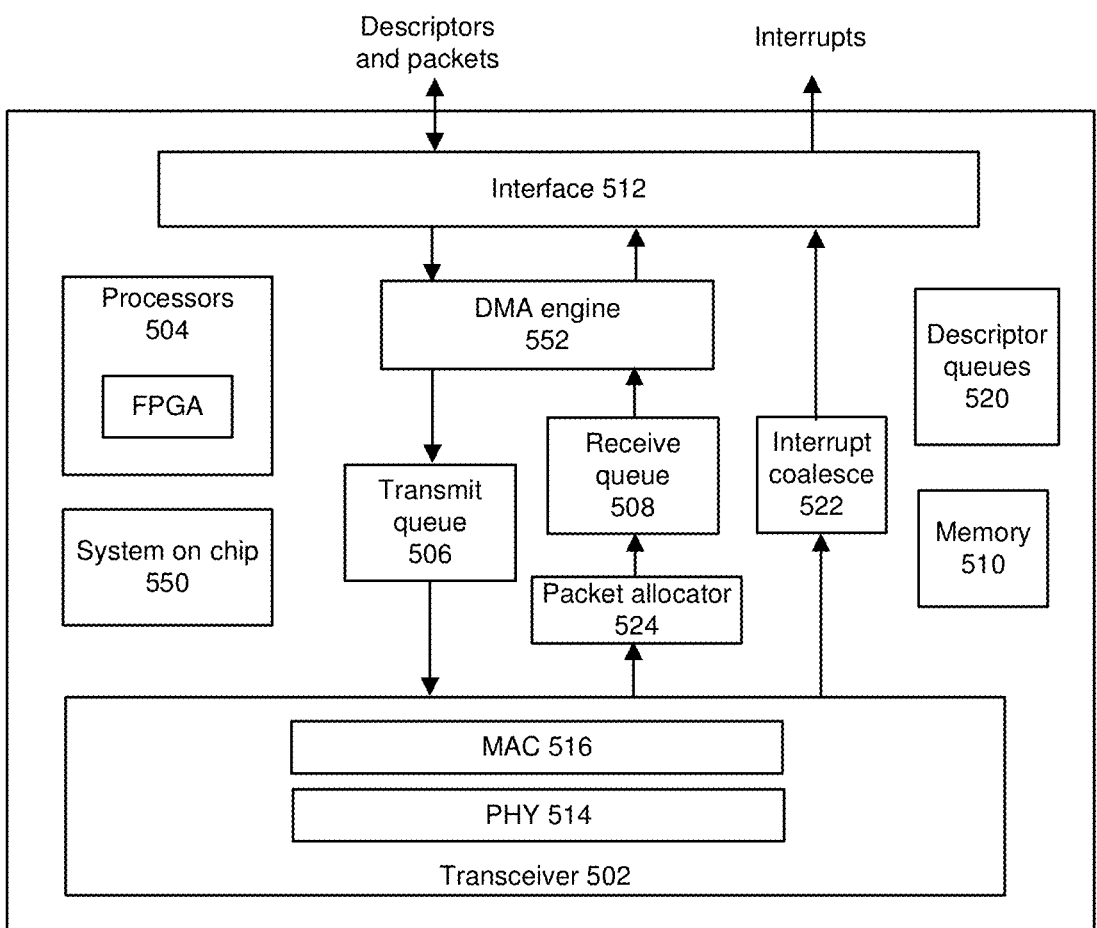
Figure 6:
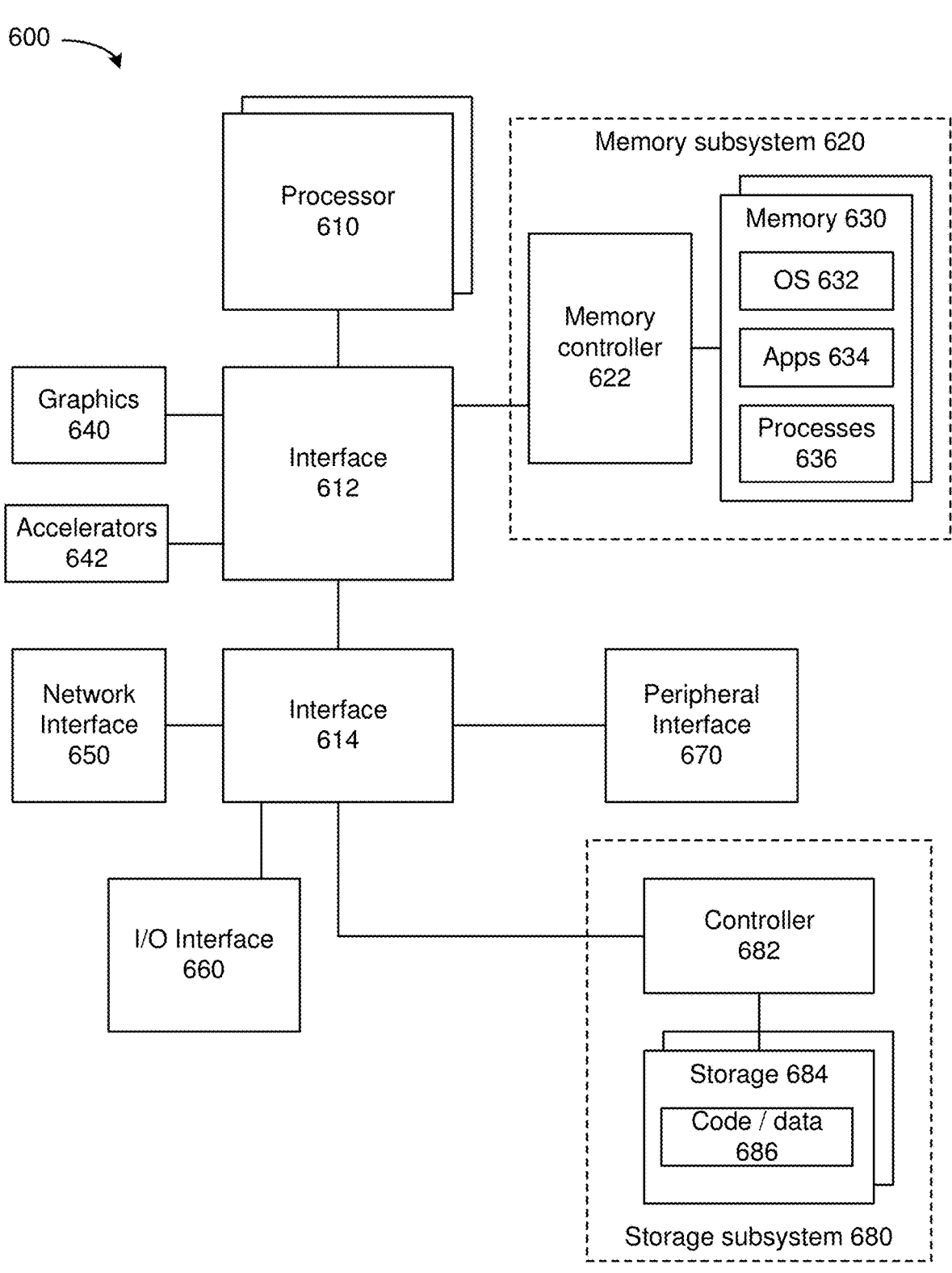
FIG. 6 depicts an example system.
Figure 7:
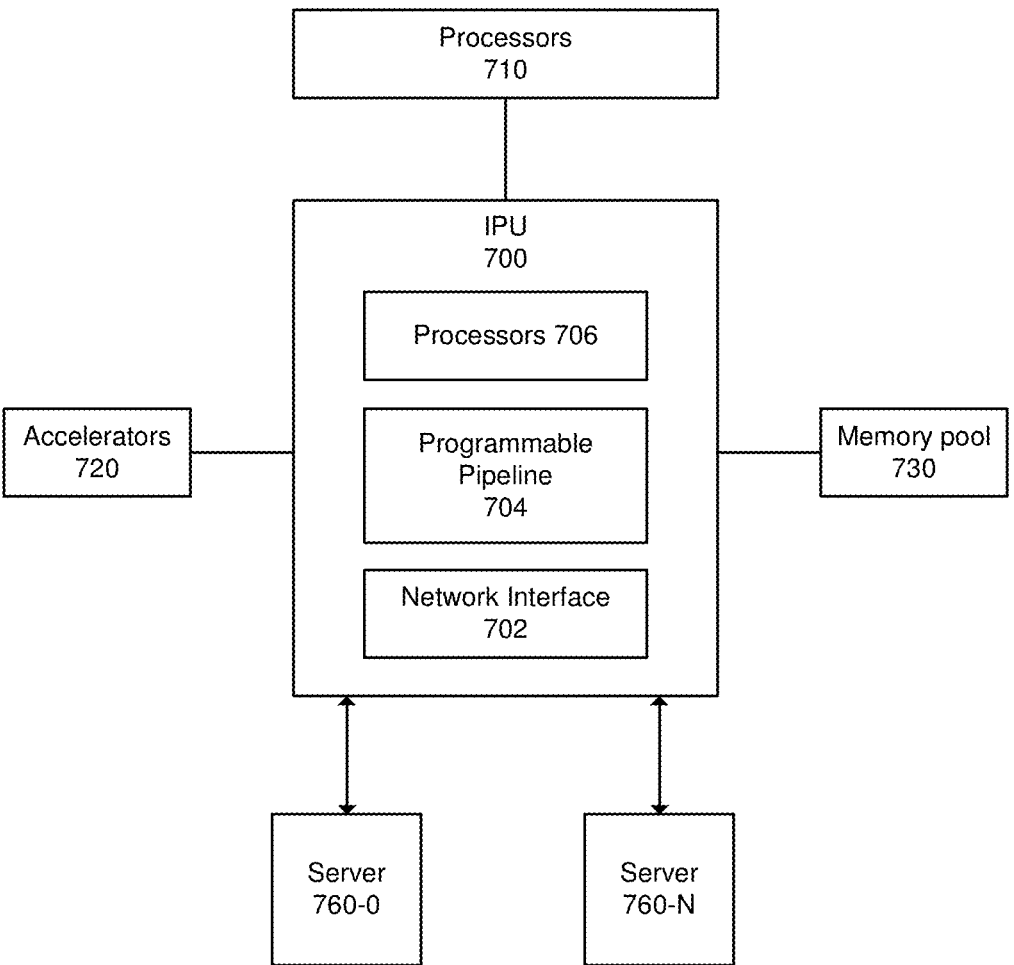
FIG. 7 depicts an example system.

Packet processing device 110 can be implemented as one or more of: a microprocessor, processor, accelerator, field programmable gate array (FPGA), application specific integrated circuit (ASIC) or circuitry described at least with respect to FIGS. 5-7. Packet processing pipeline circuitry 140 can process packets as directed or configured by one or more control planes executed by multiple compute complexes. In some examples, ACC 120 and MCC 130 can execute respective control planes 122 and 132. As described herein, control planes 122 and/or 132 can execute in one or more virtual execution environments (e.g., container, VM, microVM). Various examples of manners to update control planes 122 and/or 132 are described herein.

A virtualized execution environment (VEE) can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

SDN controller 150 can upgrade or reconfigure software executing on ACC 120 (e.g., control plane 122 and/or control plane 132) through contents of packets received through packet processing device 110. In some examples, ACC 120 can execute control plane operating system (OS) (e.g., Linux) and/or a control plane application 122 (e.g., user space or kernel modules) used by SDN controller 150 to configure operation of packet processing pipeline 140. Control plane application 122 can include Generic Flow Tables (GFT), ESXi, NSX, Kubernetes control plane software, application software for managing crypto configurations, Programming Protocol-independent Packet Processors (P4) runtime daemon, target specific daemon, Container Storage Interface (CSI) agents, or remote direct memory access (RDMA) configuration agents.

In some examples, SDN controller 150 can communicate with ACC 120 using a remote procedure call (RPC) such as Google remote procedure call (gRPC) or other service and ACC 120 can convert the request to target specific protocol buffer (protobuf) request to MCC 130. gRPC is a remote procedure call solution based on data packets sent between a client and a server. Although gRPC is an example, other communication schemes can be used such as, but not limited to, Java Remote Method Invocation, Modula-3, RPyC, Distributed Ruby, Erlang, Elixir, Action Message Format, Remote Function Call, Open Network Computing RPC, JSON-RPC, and so forth.

In some examples, SDN controller 150 can provide rules for application by ACC 120. For example, ACC 120 can program table rules (e.g., header field match and corresponding action) applied by packet processing pipeline circuitry 140 based on change in policy and changes in VMs, containers, microservices, applications, or other processes. ACC 120 can be configured to provide network policy as flow cache rules into a table to configure operation of packet processing pipeline 140. For example, the ACC-executed control plane application 122 can configure rule tables applied by packet processing pipeline circuitry 140 with rules to define a traffic destination based on packet type and content. ACC 120 can program table rules (e.g., match-action) into memory accessible to packet processing pipeline circuitry 140 based on change in policy and changes in VMs.

A flow can be a sequence of packets being transferred between two endpoints, generally representing a single session using a protocol. Accordingly, a flow can be identified, using a match, by a set of defined tuples and, for routing purpose, a flow is identified by the two tuples that identify the endpoints, e.g., the source and destination addresses. For content-based services (e.g., load balancer, firewall, Intrusion detection system etc.), flows can be identified at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

For example, ACC 120 can execute a virtual switch such as vSwitch or Open vSwitch (OVS), Stratum, or Vector Packet Processing (VPP) that provides communications between virtual machines executed by host 200 or with other devices connected to a network. For example, ACC 120 can configure packet processing pipeline circuitry 140 as to which VM is to receive traffic and what kind of traffic a VM can transmit. For example, packet processing pipeline circuitry 140 can execute a virtual switch such as vSwitch or Open vSwitch that provides communications between virtual machines executed by host 100 and packet processing device 110.

MCC 130 can execute a host management control plane, global resource manager, and perform hardware registers configuration. Control plane 132 executed by MCC 130 can perform provisioning and configuration of packet processing circuitry 140. For example, a VM executing on host 100 can utilize packet processing device 110 to receive or transmit packet traffic. MCC 130 can execute boot, power, management, and manageability software (SW) or firmware (FW) code to boot and initialize the packet processing device 110, manage the device power consumption, provide connectivity to Baseboard Management Controller (BMC), and other operations.

One or both control planes of ACC 120 and MCC 130 can define traffic routing table content and network topology applied by packet processing circuitry 140 to select a path of a packet in a network to a next hop or to a destination network-connected device. For example, a VM executing on host 100 can utilize packet processing device 110 to receive or transmit packet traffic. Configuration of packet processing device 110 resources exclusively associated with control plane 122 can be configured through the unsecure configuration path. Configuration of resources shared between control plane 122 and control plane 132 can be configured through a secure configuration. Secure configuration also configures resources used exclusively by the VM, so the VM resources can be accessed only by the designated VM.

ACC 120 can execute control plane drivers to communicate with MCC 130. At least to provide a configuration and provisioning interface between control planes 122 and 132, communication interface 125 can provide control-plane-to-control plane communications. Control plane 132 can perform a gatekeeper operation for configuration of shared resources. For example, via communication interface 125, ACC control plane 122 can communicate with control plane 132 to perform one or more of: determine hardware capabilities, access the data plane configuration, reserve hardware resources and configuration, communications between ACC and MCC through interrupts or polling, subscription to receive hardware events, perform indirect hardware registers read write for debuggability, flash and physical layer interface (PHY) configuration, or perform system provisioning for different deployments of network interface device such as: storage node, tenant hosting node, microservices backend, compute node, or others.

Communication interface 125 can be utilized by a negotiation protocol and configuration protocol running between ACC control plane 122 and MCC control plane 132. Communication interface 125 can include a general purpose mailbox for different operations performed by packet processing circuitry 140. Examples of operations of packet processing circuitry 140 include issuance of non-volatile memory express (NVMe) reads or writes, issuance of Non-volatile Memory Express over Fabrics (NVMe-oF™) reads or writes, lookaside crypto Engine (LCE) (e.g., compression or decompression), Address Translation Engine (ATE) (e.g., input output memory management unit (IOMMU) to provide virtual-to-physical address translation), encryption or decryption, configuration as a storage node, configuration as a tenant hosting node, configuration as a compute node, provide multiple different types of services between different Peripheral Component Interconnect Express (PCIe) end points, or others.

Communication interface 125 can include one or more mailboxes accessible as registers or memory addresses. For communications from control plane 122 to control plane 132, communications can be written to the one or more mailboxes by control plane drivers 124. For communications from control plane 132 to control plane 122, communications can be written to the one or more mailboxes.

Communication interface 125 can provide communications based on writes or reads to particular memory addresses (e.g., dynamic random access memory (DRAM)), registers, other mailbox that is written-to and read-from to pass commands and data. To provide for secure communications between control planes 122 and 132, registers and memory addresses (and memory address translations) for communications can be available only to be written to or read from by control planes 122 and 132 or cloud service provider (CSP) software executing on ACC 120 and device vendor software, embedded software, or firmware executing on MCC 130. In some examples, communications (e.g., messages, descriptors, and/or data communicated) between ACC 120 and MCC 130 can be encrypted whereby a sender can encrypt the communications and the receiver can decrypt the received communications based on a key.

Communication interface 125 can support communications between multiple different compute complexes such as from host 100 to MCC 130, host 100 to ACC 120, MCC 130 to ACC 120, baseboard management controller (BMC) to MCC 130, BMC to ACC 120, or BMC to host 100. Communication interface 125 can permit scaling up and/or down a number of devices or processes that are able to be configured when accelerator or compute complexes are added or removed. Communication interface 125 can support communications with more than two control planes (e.g., three or more) such as control planes executing on packet processing device 110 and/or host 100.

Communication interface 125 can transfer remote procedure call (RPC) protocol buffers (protobufs) for making direct application program interface (API) calls from one complex to another (e.g., ACC 120 to MCC 130, MCC 130 to ACC 120, SDN controller 150 to ACC 120 or MCC 130, or host 100 to ACC 120 or MCC 130). A same channel can be used for subscribing to events coming from the device to the control plane application.

Communications written to mailboxes can include descriptors which include message opcode, message error, message parameters, and other information. Communications written to mailboxes can include defined format messages that convey data.

Packet processing circuitry 140 can be implemented using one or more of: application specific integrated circuit (ASIC), field programmable gate array (FPGA), processors executing software, or other circuitry. Various examples of packet processing pipeline circuitry 140 are described herein. Control plane 122 and/or 132 can configure packet processing pipeline circuitry 140 or other processors to perform operations related to NVMe, NVMe-oF reads or writes, lookaside crypto Engine (LCE), Address Translation Engine (ATE), local area network (LAN), compression/decompression, encryption/decryption, or other accelerated operations.

Various message formats can be used to configure ACC 120 or MCC 130. In some examples, a P4 program can be compiled and provided to MCC 130 to configure packet processing circuitry 140. The following is a JSON configuration file that can be transmitted from ACC 120 to MCC 130 to get capabilities of packet processing circuitry 140 and/or other circuitry in packet processing device 110. More particularly, the file can be used to specify a number of transmit queues, number of receive queues, number of supported traffic classes (TC), number of available interrupt vectors, number of available virtual ports and the types of the ports, size of allocated memory, supported parser profiles, exact match table profiles, packet mirroring profiles, among others.

Figure 1B:
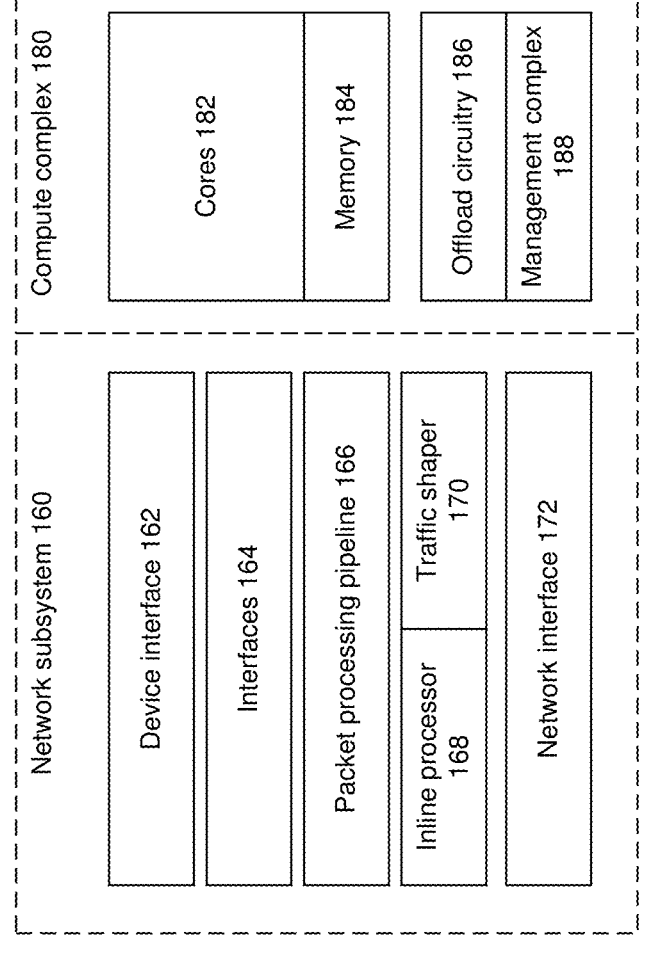

FIG. 1B depicts an example system. Various examples of packet processing device or data plane circuitry 110 can utilize components of the system of FIG. 1B. Network subsystem 160 can be communicatively coupled to compute complex 180. Device interface 162 can provide an interface to communicate with a host. Various examples of device interface 162 can utilize protocols based on Peripheral Component Interconnect Express (PCIe), Compute Express Link (CXL), or others as well as virtual device interface such as virtual device interfaces.

Interfaces 164 can initiate and terminate at least offloaded remote direct memory access (RDMA) operations, NVMe reads or writes operations, and LAN operations. Packet processing pipeline 166 can perform packet processing (e.g., packet header and/or packet payload) based on a configuration and support quality of service (QoS) and telemetry reporting. Inline processor 168 can perform offloaded encryption or decryption of packet communications (e.g., Internet Protocol Security (IPSec) or others). Traffic shaper 170 can schedule transmission of communications. Network interface 172 can provide an interface at least to an Ethernet network by media access control (MAC) and serializer/deserializer (Serdes) operations.

Cores 182 can be configured to perform infrastructure operations such as storage initiator, Transport Layer Security (TLS) proxy, virtual switch (e.g., vSwitch), or other operations. Memory 184 can store applications and data to be performed or processed. Offload circuitry 186 can perform at least cryptographic and compression operations for host or use by compute complex 180. Management complex 188 can perform secure boot, life cycle management and management of network subsystem 160 and/or compute complex 180.

Figure 2:
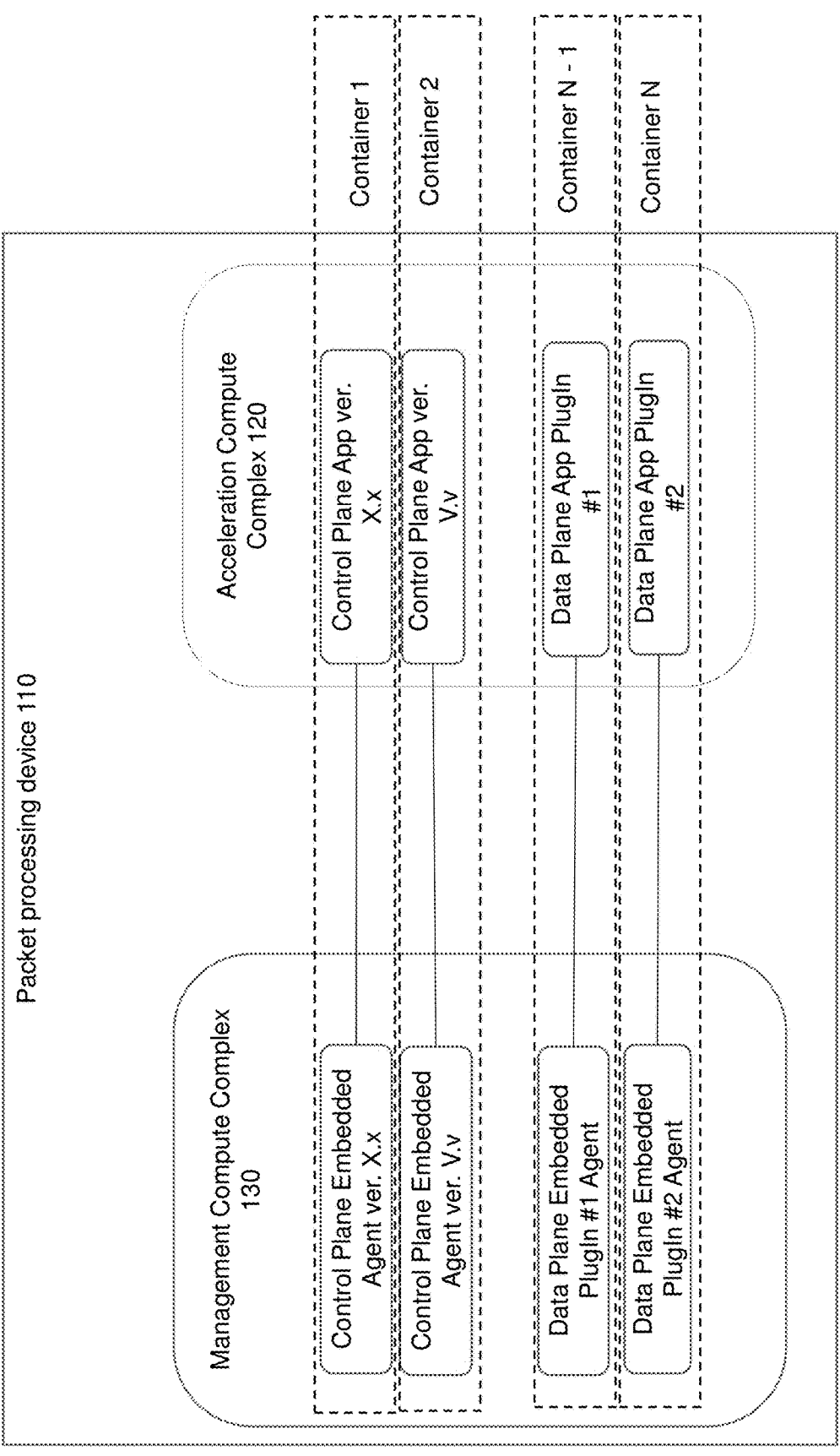
FIG. 2 depicts an example system.

FIG. 2 depicts an example system. In some examples, ACC 120 can execute control and/or data plane software to configure operations of packet processing device 110. In some examples, in ACC 120, control plane and/or data plane applications can be executed in virtual execution environments. Configuration of control and data plane applications can occur by privileged software components executing on MCC 130 by commands transmitted through communication interface 125 to ACC 120.

In some examples, MCC 130 can execute privileged control plane software responsible for boot, resource provisioning, and system management. MCC 130 can execute control plane and data plane agents to support configuration requests from other complexes and/or SDN to configure privileged device resources. In some examples, in MCC 130, control plane and/or data plane agents can be executed in virtual execution environments.

According to some examples, containers or other virtual execution environments can be deployed on ACC 120 and MCC 130 for distributed control and data planes whereby ACC 120 and MCC 130 can execute multiple and independent instances of agent and application containers. Control plane operations can be distributed between control plane software stack executing on ACC 120, including its embedded dependencies, and an associated embedded agent executed on MCC 130. Multiple instances of an application can be installed on ACC 120 and MCC 130 to support seamless embedded software and/or firmware update by installing a new or different version (e.g., prior version) of embedded software and/or firmware while executing an existing version of embedded software and/or firmware, switching to execution of the new or different version of embedded software and/or firmware (e.g., version V.v), and disabling the existing version of embedded software and/or firmware (e.g., version X.x).

Installing different versions of an application that execute in parallel on ACC 120 and MCC 130 can be useful for dynamic patching, internal validation environments, or other purposes such as debug scenarios. A new or different version of an application can include improvements and/or bug fixes that can be executed without disturbing existing flows. Another version of the application can be disabled after installation of the new or different version of the application. From a security perspective, components on ACC 120 and MCC 130 can be signed and authenticated by a routine executing on a target complex before installation or active deployment.

For example, updating non-volatile memory (NVM) image (e.g., firmware) can occur by installing and executing control plane and/or data plane applications in virtual execution environment(s) in ACC 120 and MCC 130. Installing and executing control plane and/or data plane applications in virtual execution environment(s) in MCC 130 can occur by using firmware update tools, such as "devlink dev flash" in Linux and then executing a single agent instance to support configuration requests from applications executed on ACC 120. Accordingly, updating firmware can occur by installing and executing control plane and/or data plane applications in virtual execution environment(s) in ACC 120 and MCC 130 without full re-initialization of a network interface device that can potentially disrupt network traffic to and from packet processing device 110. A partial or full re-burn of the embedded software (e.g., firmware stack) can be avoided and provide partial or full re-initialization of software stack without system down time and can avoid potential embedded software update issues. In addition, some examples provide an isolated control plane by supporting an option to replace or even extend existing agents without disturbing agents executing on MCC 130. In addition, this upgrade mechanism can be applied at scale and permit frequent upgrades for cloud deployment scenarios.

In some examples, boot firmware code or firmware can include one or more of: Basic Input/Output System (BIOS), Universal Extensible Firmware Interface (UEFI), or a boot loader. The BIOS firmware can be pre-installed on a personal computer's system board or accessible through an SPI interface from a boot storage (e.g., flash memory). In some examples, firmware can include SPS. In some examples, a Universal Extensible Firmware Interface (UEFI) can be used instead or in addition to a BIOS for booting or restarting cores or processors. UEFI is a specification that defines a software interface between an operating system and platform firmware. UEFI can read from entries from disk partitions by not just booting from a disk or storage but booting from a specific boot loader in a specific location on a specific disk or storage. UEFI can support remote diagnostics and repair of computers, even with no operating system installed. A boot loader can be written for UEFI and can be instructions that a boot code firmware can execute and the boot loader is to boot the operating system(s). A UEFI bootloader can be a bootloader capable of reading from a UEFI type firmware.

A UEFI capsule is a manner of encapsulating a binary image for firmware code updates. But in some examples, the UEFI capsule is used to update a runtime component of the firmware code. The UEFI capsule can include updatable binary images with relocatable Portable Executable (PE) file format for executable or dynamic linked library (.dll) files based on COFF (Common Object File Format). For example, the UEFI capsule can include executable (*.exe) files. This UEFI capsule can be deployed to a target platform as an SMM image via existing OS specific techniques (e.g., Windows Update for Azure, or LVFS for Linux).

In some examples, a control plane and/or data plane can be extended. If an existing device deployment does not support Media Access Control security (MACsec) over a communication over a virtual device interface (e.g., Intel® Scalable I/O Virtualization (SIOV), Single Root I/O Virtualization (SR-IOV), or others) functionality and configuration, a plug-in may be installed on MCC 130 that supports these functionalities. MACsec is defined at least by Institute of Electrical and Electronics Engineers (IEEE) standard 802.1AE-2018 and provides for authentication and encryption of Ethernet frames for point-to-point security on Ethernet links. An Embedded Agent can be installed in a virtual execution environment on MCC 130 that provides MACSec over SIOV configuration commands. A control plane application can be installed in a container on ACC 120 to communicate with the Embedded Agent using MACSec over SIOV commands.

Another example can extend a control plane to gather telemetry data by execution of a process on MCC 130 and stream the telemetry data to a control plane application executing on ACC 120. Examples of telemetry data can include one or more of: buffer fullness, received network congestion indicators, memory utilization, network bandwidth, or others.

Figure 3:
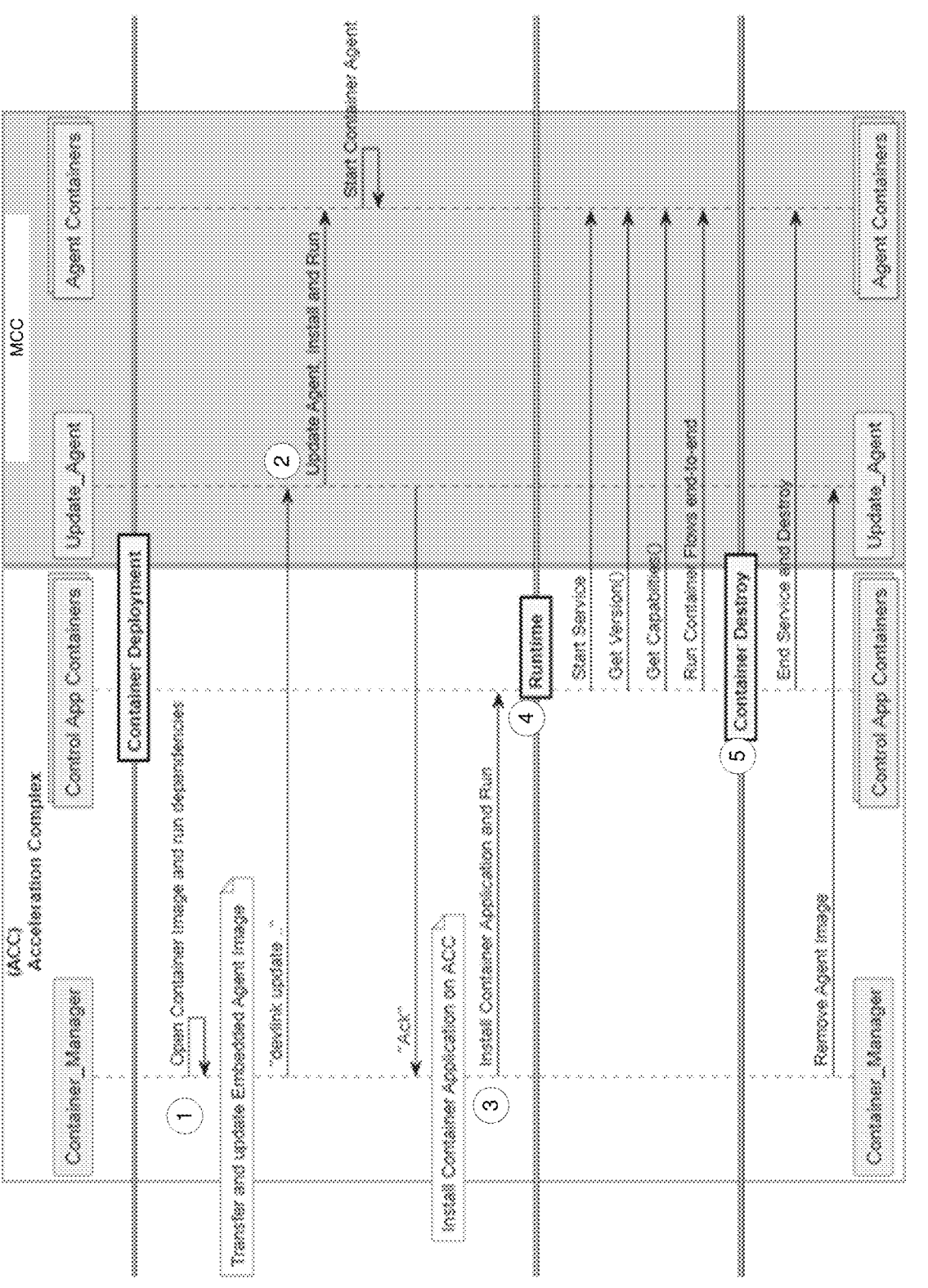
FIG. 3 depicts an example of operations.

FIG. 3 depicts an example of operations. At (1), a container image including ACC control plane application, executing in a container or other VEE, can be opened with dependencies to an Embedded Agent Update tool (e.g., devlink) and embedded application image to be provisioned on an MCC. For example, a container manager running on ACC can open a container image on the ACC that hosts an application (e.g., firmware) with dependencies to control plane embedded agent running on MCC.

At (2), the container manager can transfer and update Embedded Agent image executing in MCC (e.g., devlink dev flash in Linux). For example, Update_agent executing on the MCC can update an agent running on MCC with a new or different version of an Embedded Agent image and can start a container agent that hosts the new or different version of the Embedded Agent image.

After indication from Update_agent executing on MCC that devlink update successful (e.g., Ack), at (3), the container manager can install and run a container application on the ACC. A control plane executing in a container executing on ACC can start execution of the new or different version of an Embedded Agent image for execution on the MCC. At (4), the control plane executing in a container executing on ACC can start utilizing a new or updated Embedded Agent image based on satisfying one or more conditions. For example, control plane executing in a container executing on ACC can determine if one or more of the following conditions are met: start service to start execution of the new or different version of an Embedded Agent image executing on MCC, get_version to determine if version of Embedded Agent image executing on MCC is compatible with control plane executing in a container executing on ACC, get capabilities to access capabilities of Embedded Agent image to determine if features supported by Embedded Agent image executing on MCC are utilized by control plane executing in a container executing on ACC, or run container flows end-to-end.

At (5), in case of upgrading to use of a new or different version of Embedded Agent image, the control plane executing in a container, executing on ACC, can cause a prior version of the Embedded Agent image, executing on MCC, to cease execution and container manager can remove the prior version of the Embedded Agent image from execution to allow new or different version of Embedded Agent image to proceed with utilization.

Figure 4:
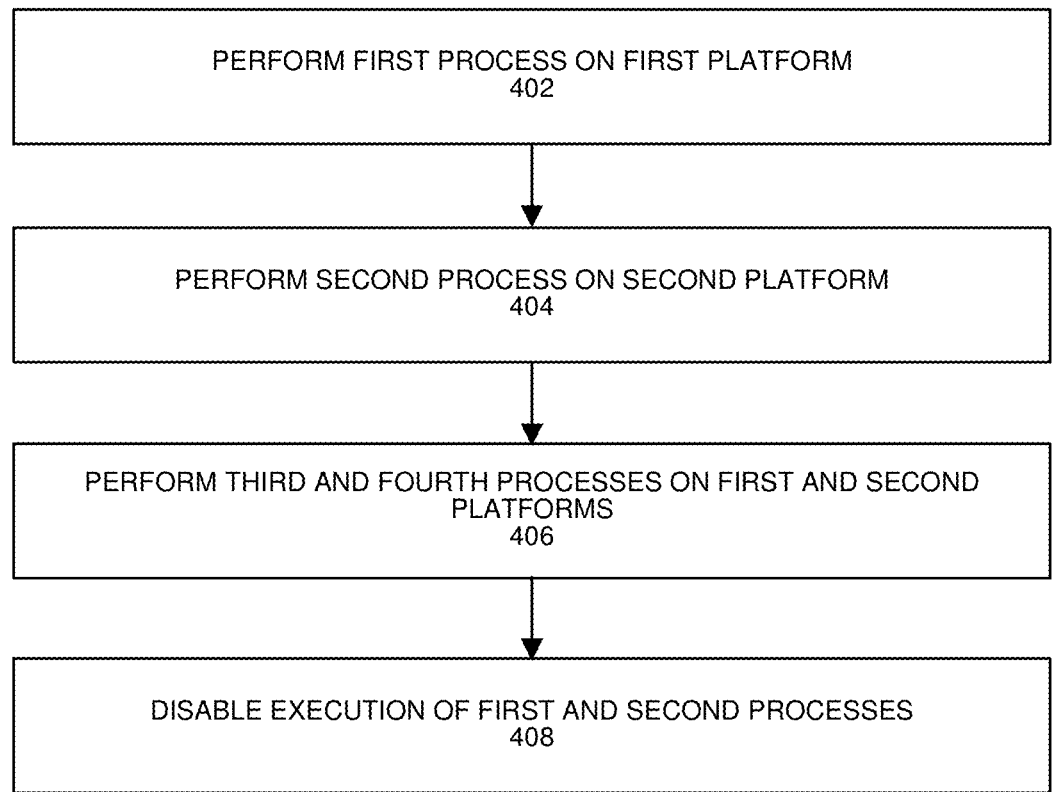
FIG. 4 depicts an example process.

FIG. 4 depicts an example process. The process can be performed for communication between control planes executing in different compute complexes or platforms. At 402, a first process can be executed in a first virtual execution environment on a first compute complex or platform to provide control plane and/or data plane operations. At 404, a second process can be executed in a second virtual execution environment on a second compute complex or platform to control plane and/or data plane operations. The first and second processes can communicate and to provide control plane and/or data plane operations distributed over first and second compute complexes.

At 406, to update operations of the first process and second process, third and fourth processes can be executed in respective third and fourth virtual execution environments on respective first and second complexes or platforms. At 408, the first and second processes can be deactivated and the third and fourth processes can be activated to provide updated control plane and/or data plane operations. For example, the third process can activate the fourth process based on verification of one or more of: same or overlapping versions or same or overlapping capabilities.

FIG. 5 depicts an example network interface device or packet processing device. In some examples, updating embedded software (e.g., firmware) can be performed by a first process, executing in a first processor, changing an active control plane process from a first control plane process executed in a second processor to a second control plane process executed in the second processor, as described herein. In some examples, packet processing device 500 can be implemented as a network interface controller, network interface card, a host fabric interface (HFI), or host bus adapter (HBA), and such examples can be interchangeable. Packet processing device 500 can be coupled to one or more servers using a bus, PCIe, CXL, or DDR. Packet processing device 500 may be embodied as part of a system-on-a-chip (SoC) that includes one or more processors, or included on a multichip package that also contains one or more processors.

Some examples of packet processing device 500 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 500 can include transceiver 502, processors 504, transmit queue 506, receive queue 508, memory 510, and bus interface 512, and DMA engine 552. Transceiver 502 can be capable of receiving and transmitting packets in conformance with the applicable protocols such as Ethernet as described in IEEE 802.3, although other protocols may be used. Transceiver 502 can receive and transmit packets from and to a network via a network medium (not depicted). Transceiver 502 can include PHY circuitry 514 and media access control (MAC) circuitry 516. PHY circuitry 514 can include encoding and decoding circuitry (not shown) to encode and decode data packets according to applicable physical layer specifications or standards. MAC circuitry 516 can be configured to assemble data to be transmitted into packets, that include destination and source addresses along with network control information and error detection hash values.

Processors 504 can be any a combination of a: processor, core, graphics processing unit (GPU), field programmable gate array (FPGA), application specific integrated circuit (ASIC), or other programmable hardware device that allow programming of network interface 500. For example, a "smart network interface" can provide packet processing capabilities in the network interface using processors 504.

Processors 504 can include one or more packet processing pipeline that can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines can perform one or more of: packet parsing (parser), exact match-action (e.g., small exact match (SEM) engine or a large exact match (LEM)), wildcard match-action (WCM), longest prefix match block (LPM), a hash block (e.g., receive side scaling (RSS)), a packet modifier (modifier), or traffic manager (e.g., transmit rate metering or shaping). For example, packet processing pipelines can implement access control list (ACL) or packet drops due to queue overflow.

Configuration of operation of processors 504, including its data plane, can be programmed based on one or more of: Protocol-independent Packet Processors (P4), Software for Open Networking in the Cloud (SONiC), Broadcom® Network Programming Language (NPL), NVIDIA® CUDA®, NVIDIA® DOCA™, Infrastructure Programmer Development Kit (IPDK), among others. Processors 504 and/or system on chip 550 can execute update embedded software (e.g., firmware) by a first process, executing in a first processor, changing an active control plane process from a first control plane process executed in a second processor to a second control plane process executed in the second processor, as described herein.

Packet allocator 524 can provide distribution of received packets for processing by multiple CPUs or cores using timeslot allocation described herein or RSS. When packet allocator 524 uses RSS, packet allocator 524 can calculate a hash or make another determination based on contents of a received packet to determine which CPU or core is to process a packet.

Interrupt coalesce 522 can perform interrupt moderation whereby network interface interrupt coalesce 522 waits for multiple packets to arrive, or for a time-out to expire, before generating an interrupt to host system to process received packet(s). Receive Segment Coalescing (RSC) can be performed by network interface 500 whereby portions of incoming packets are combined into segments of a packet. Network interface 500 provides this coalesced packet to an application.

Direct memory access (DMA) engine 552 can copy a packet header, packet payload, and/or descriptor directly from host memory to the network interface or vice versa, instead of copying the packet to an intermediate buffer at the host and then using another copy operation from the intermediate buffer to the destination buffer.

Memory 510 can be any type of volatile or non-volatile memory device and can store any queue or instructions used to program network interface 500. Transmit queue 506 can include data or references to data for transmission by network interface. Receive queue 508 can include data or references to data that was received by network interface from a network. Descriptor queues 520 can include descriptors that reference data or packets in transmit queue 506 or receive queue 508. Bus interface 512 can provide an interface with host device (not depicted). For example, bus interface 512 can be compatible with PCI, PCI Express, PCI-x, Serial ATA, and/or USB compatible interface (although other interconnection standards may be used).

FIG. 6 depicts a system. In some examples, updating embedded software can be performed by a first process, executing in a first processor, changing an active control plane process from a first control plane process executed in a second processor to a second control plane process executed in the second processor, as described herein. System 600 includes processor 610, which provides processing, operation management, and execution of instructions for system 600. Processor 610 can include any type of microprocessor, central processing unit (CPU), graphics processing unit (GPU), XPU, processing core, or other processing hardware to provide processing for system 600, or a combination of processors. An XPU can include one or more of: a CPU, a graphics processing unit (GPU), general purpose GPU (GPGPU), and/or other processing units (e.g., accelerators or programmable or fixed function FPGAs). Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a display that provides an output to a user. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a programmable or fixed function offload engine that can be accessed or used by a processor 610. For example, an accelerator among accelerators 642 can provide data compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models to perform learning and/or inference operations.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

Applications 634 and/or processes 636 can refer instead or additionally to a virtual machine (VM), container, microservice, processor, or other software. Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

In some examples, OS 632 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a processor sold or designed by Intel®, ARM®, AMD®, Qualcomm®, IBM®, Nvidia®, Broadcom®, Texas Instruments®, among others.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 technology to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. In some examples, packet processing device or network interface device 650 can refer to one or more of: a network interface controller (NIC), a remote direct memory access (RDMA)-enabled NIC, SmartNIC, router, switch, forwarding element, infrastructure processing unit (IPU), or data processing unit (DPU). An example IPU or DPU is described with respect to FIG. 5 or 7.

In some examples, configuration of programmable pipelines of network interface 650 can be programmed using multiple control planes executing on one or more processors (e.g., one or more of processor 610 or one or more processors in network interface 650) using a communication interface, as described herein. In some examples, updating embedded software (e.g., firmware) can be performed by a first process, executing in a first processor, changing an active control plane process from a first control plane process executed in a second processor to a second control plane process executed in the second processor, as described herein.

In one example, system 600 includes one or more input/output (I/O) interface(s) 660. I/O interface 660 can include one or more interface components through which a user interacts with system 600. Peripheral interface 670 can include any hardware interface not specifically mentioned above. Peripherals refer generally to devices that connect dependently to system 600.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. A non-volatile memory (NVM) device is a memory whose state is determinate even if power is interrupted to the device.

In an example, system 600 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe (e.g., a non-volatile memory express (NVMe) device can operate in a manner consistent with the Non-Volatile Memory Express (NVMe) Specification, revision 1.3c, published on May 24, 2018 ("NVMe specification") or derivatives or variations thereof).

Communications between devices can take place using a network that provides die-to-die communications; chip-to-chip communications; circuit board-to-circuit board communications; and/or package-to-package communications.

In an example, system 600 can be implemented using interconnected compute sleds of processors, memories, storages, network interfaces, and other components. High speed interconnects can be used such as PCIe, Ethernet, or optical interconnects (or a combination thereof).

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

FIG. 7 depicts an example system. In this system, IPU 700 manages performance of one or more processes using one or more of processors 706, processors 710, accelerators 720, memory pool 730, or servers 740-0 to 740-N, where N is an integer of 1 or more. In some examples, processors 706 of IPU 700 can execute one or more processes, applications, VMs, containers, microservices, and so forth that request performance of workloads by one or more of: processors 710, accelerators 720, memory pool 730, and/or servers 740-0 to 740-N. IPU 700 can utilize network interface 702 or one or more device interfaces to communicate with processors 710, accelerators 720, memory pool 730, and/or servers 740-0 to 740-N. IPU 700 can utilize programmable pipeline 704 to process packets that are to be transmitted from network interface 702 or packets received from network interface 702.

In some examples, programmable pipelines 704 can be programmed using one or more control planes executing on one or more processors (e.g., one or more of processors 706) using a communication interface, as described herein. In some examples, embedded software (e.g., firmware) provided by a control plane can be updated by installing and executing a second process and causing the second process to execute, as described herein.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission, or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items.

The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising: a network interface, a host interface, and multiple processors, wherein: a first processor of the multiple processors is to execute a first control plane process and an embedded software update is to occur by: installation and execution of a second control plane process on the first processor and a third control plane process is to cause utilization of the second control plane process.

Example 2 includes one or more examples, wherein the third control plane process is to execute on a second processor of the multiple processors.

Example 3 includes one or more examples, wherein the third control plane process is to execute on a second processor of the multiple processors and the third control plane process is to execute in a virtual execution environment.

Example 4 includes one or more examples, wherein the third control plane process is to cause discontinuation of operations of the first control plane process after the cause utilization of the second control plane process.

Example 5 includes one or more examples, wherein the first control plane process is to execute in a first virtual execution environment and the second control plane process is to execute in a second virtual execution environment.

Example 6 includes one or more examples, wherein the embedded software update comprises addition of capabilities of one or more of: Media Access Control security (MACsec), communication over a virtual device interface, or telemetry reporting.

Example 7 includes one or more examples, wherein the third control plane process is to verify version and capabilities of the second control plane process prior to the third control plane process causing utilization of the second control plane process.

Example 8 includes one or more examples, wherein the second and third control plane processes are signed and authenticated.

Example 9 includes one or more examples, wherein the network interface device comprises data plane circuitry and wherein the first and second control plane processes are to configure operations of the data plane circuitry.

Example 10 includes one or more examples, and includes a method comprising: in a network interface device: updating embedded software of the network interface device by a process, executed in a first processor, changing an active control plane process from a first control plane process executed in a second processor to a second control plane process executed in the second processor.

Example 11 includes one or more examples, wherein the first control plane process executes in a virtual execution environment and the second control plane process executes in a virtual execution environment.

Example 12 includes one or more examples, and includes the process causing discontinuation of operations of the first control plane process after causing execution of the second control plane process.

Example 13 includes one or more examples, wherein the embedded software update comprises addition of capabilities of one or more of: Media Access Control security (MACsec), communication over a virtual device interface, or telemetry reporting.

Example 14 includes one or more examples, and includes the process verifying version and capabilities of the second control plane process prior to causing utilization of the second control plane process.

Example 15 includes one or more examples, wherein the second and third control plane processes are signed and authenticated.

Example 16 includes one or more examples, and includes a non-transitory computer-readable medium comprising instructions stored thereon, that if executed by one or more processors, cause the one or more processors to: updating embedded software of a network interface device by a first process, executing in a first processor, changing an active control plane process from a first control plane process executed in a second processor to a second control plane process executed in the second processor.

Example 17 includes one or more examples, and includes instructions stored thereon, that if executed by one or more processors, cause the one or more processors to: cause the process to cause discontinuation of operations of the first control plane process after causing execution of the second control plane process.

Example 18 includes one or more examples, wherein the embedded software update comprises addition of capabilities of one or more of: Media Access Control security (MACsec), communication over a virtual device interface, or telemetry reporting.

Example 19 includes one or more examples, wherein: the process is to verify version and capabilities of the second control plane process prior to causing utilization of the second control plane process.

Example 20 includes one or more examples, wherein the second and third control plane processes are signed and authenticated.

What is claimed is:

1. A method comprising:

in a network interface device:

updating embedded software of the network interface device by: a process, executed in a first processor, changing an active control plane process from a first control plane process executed in a second processor to a second control plane process deployed in a container and executed in the second processor.

2. The method of claim 1, comprising:

the process causing discontinuation of operations of the first control plane process after causing execution of the second control plane process.

3. The method of claim 1, wherein the embedded software update comprises addition of capabilities of one or more of: Media Access Control security (MACsec), communication over a virtual device interface, or telemetry reporting.

4. The method of claim 1, comprising:

the process verifying version and capabilities of the second control plane process prior to causing utilization of the second control plane process.

5. The method of claim 1, wherein the first and second control plane processes are signed and authenticated.

6. At least one non-transitory computer-readable medium comprising instructions stored thereon, that if executed by one or more processors, cause the one or more processors to:

update embedded software of a network interface device by: a process, executing in a first processor, changing an active control plane process from a first control plane process executed in a second processor to a second control plane process deployed in a container and executed in the second processor.

7. The computer-readable medium of claim 6, comprising instructions stored thereon, that if executed by one or more processors, cause the one or more processors to:

cause the process to cause discontinuation of operations of the first control plane process after causing execution of the second control plane process.

8. The computer-readable medium of claim 6, wherein the embedded software update comprises addition of capabilities of one or more of: Media Access Control security (MACsec), communication over a virtual device interface, or telemetry reporting.

9. The computer-readable medium of claim 6, wherein:

the process is to verify version and capabilities of the second control plane process prior to causing utilization of the second control plane process.

10. The computer-readable medium of claim 6, wherein the first and second control plane processes are signed and authenticated.

11. The computer-readable medium of claim 6, wherein the embedded software update comprises an update to firmware.

12. An apparatus comprising:

a network interface device comprising:

a network interface, a host interface, and one or more processors configured to:

update embedded software of the network interface device by a process, executed by a first processor of the one or more processors, change an active control plane process from a first control plane process, executed in a second processor of the one or more processors, to a second control plane process deployed in a container and executed in the second processor.

13. The apparatus of claim 12, wherein the process is to cause discontinuation of operations of the first control plane process after causing execution of the second control plane process.

14. The apparatus of claim 12, wherein the embedded software update comprises addition of capabilities of one or more of: Media Access Control security (MACsec), communication over a virtual device interface, or telemetry reporting.

15. The apparatus of claim 12, wherein:

the process is to verify version and capabilities of the second control plane process prior to causing utilization of the second control plane process.

16. The apparatus of claim 12, wherein the first and second control plane processes are signed and authenticated.

17. The apparatus of claim 12, wherein the embedded software update comprises an update to firmware.

* * * * *